P. PASQUARIELLO.
FRICTION BRAKE.
APPLICATION FILED JUNE 24, 1920.
1,383,013.
Patented June 28, 1921.
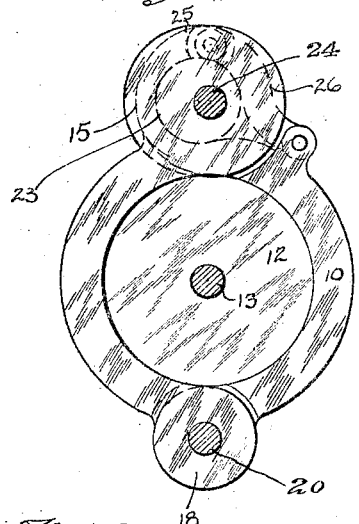
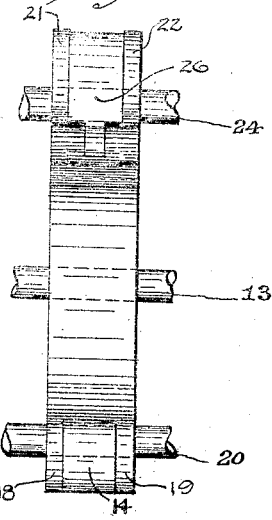
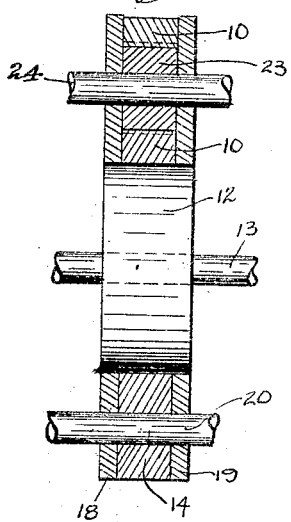
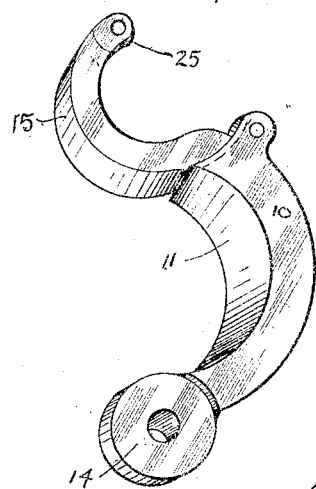
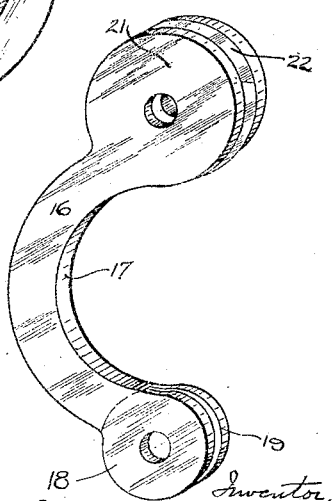
Inventor.
Pasquale Pasquariello
by Seymour & Earle Attys

UNITED STATES PATENT OFFICE.

PASQUALE PASQUARIELLO, OF HAMDEN, CONNECTICUT.

FRICTION-BRAKE.

1,383,013.  Specification of Letters Patent.  Patented June 28, 1921.

Application filed June 24, 1920. Serial No. 391,442.

*To all whom it may concern:*

Be it known that I, PASQUALE PASQUARIELLO, a subject of the King of Italy, residing at Hamden, in the county of New Haven and State of Connecticut, have invented a new and useful Improvement in Friction-Brakes; and I do hereby declare the following, when taken in connection with the accompanying drawings, and the characters of reference marked thereon, to be a full, clear, and exact description of the same, and which said drawings constitute part of this application, and represent, in—

Figure 1, a side view of a friction brake constructed in accordance with my invention;

Fig. 2, an edge view of the same;

Fig. 3, a view in vertical section;

Fig. 4, a perspective view of one of the brake members detached;

Fig. 5, a perspective view of the other member detached.

This invention relates to an improvement in friction brakes adapted for use on motor vehicles or in extension-ladders, such as shown and described in the application filed by me June 24, 1920, Serial No. 391,443, the object of the invention being the arrangement of parts whereby a powerful brake will be provided; and the invention consists in the construction as hereinafter described and particularly recited in the claims.

In carrying out my invention, I employ a brake-body 10 having a brake-shoe 11 corresponding in curvature to the brake-block 12 on the shaft 13, which is to be controlled. This body 10 is formed at one end with a knuckle 14 and at its opposite end with a reversely curved hook 15. The component member 16 has a brake-face 17 for co-action with the brake-block 12 and is formed at its lower end with two knuckles 18 and 19 between which the knuckle 14 may be inserted, whereby the two parts may be hinged together by a pin 20. The component member 16 is also provided at its upper end with two disk-like heads 21 and 22 between which the hook 15 is inserted. The inner surface of the hook 15 is semi-circular to embrace a cam 23 on a cam-shaft 24 extending through the disks 21 and 22. If desired, the outer end 25 of the hook may be connected to the body 10 by means of a link 26, although this is not essential.

When the two members of the brake are connected together around the brake-block 12 and the cam located within the hook and supported by the component member, a movement of the cam in one direction will draw the brake members together firmly against the brake-block and so as to hold that block against turning. A movement in the opposite direction will release the tension on the block, permitting it to run free. With this arrangement of brake members, the application of a slight force upon the cam will cramp the members with considerable force upon the brake-block, thus providing a very effective brake for motor vehicles or other purposes where a safe brake is required.

I claim:

1. A brake composed of two members, one including a body provided at one end with a knuckle and at the opposite end with a reversely curved hook, a component member provided at one end with a pair of knuckles between which the knuckle of the other member may extend, and with two disk-like heads between which the said hook may be inserted, a cam mounted in the said heads and having a bearing in said hook, whereby the turning of the cam will draw the two members together.

2. A brake comprising two component members, each including a brake-bearing body, said members each provided at one end with knuckles, whereby the members may be hinged together, one member provided with a reversely turned hook, the other member provided with two parallel disk-like heads between which the said hook is inserted, a cam-shaft bearing in said heads, a cam on said shaft within said hook, whereby said members may be drawn together.

3. A brake comprising two component members, each including a brake-bearing body, said members each provided at one end with knuckles, whereby the members may be hinged together, one member provided with a reversely turned hook, the other member provided with two parallel disk-like heads between which the said hook is inserted, a cam-shaft bearing in said heads, a cam on said shaft within said hook, whereby said members may be drawn together, and a link closing the opening to the said hook.

In testimony whereof, I have signed this specification in the presence of two subscribing witnesses.

PASQUALE PASQUARIELLO.

Witnesses:
H. ROSCOE ALLEN,
WILLIAM J. FORD.